UNITED STATES PATENT OFFICE.

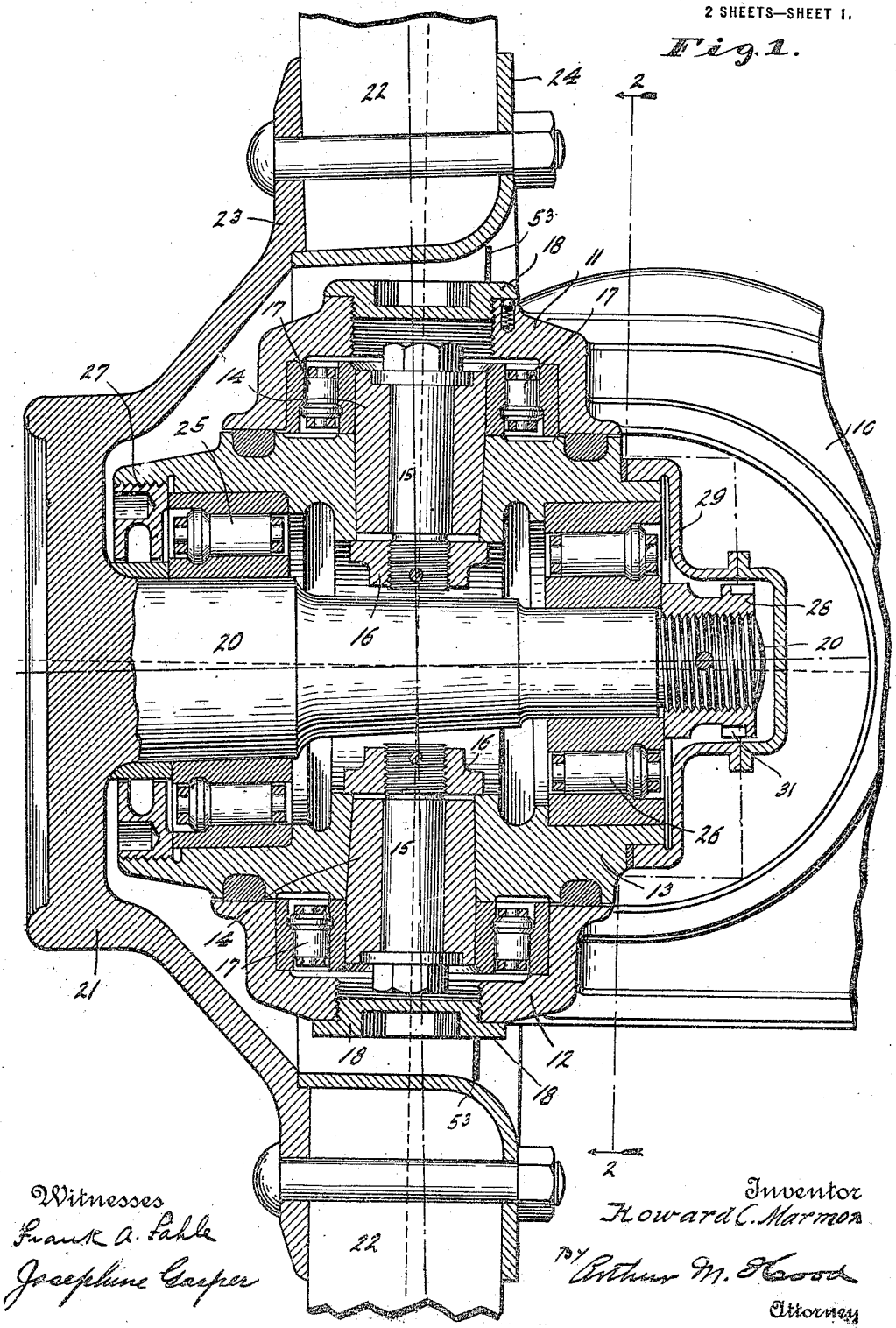

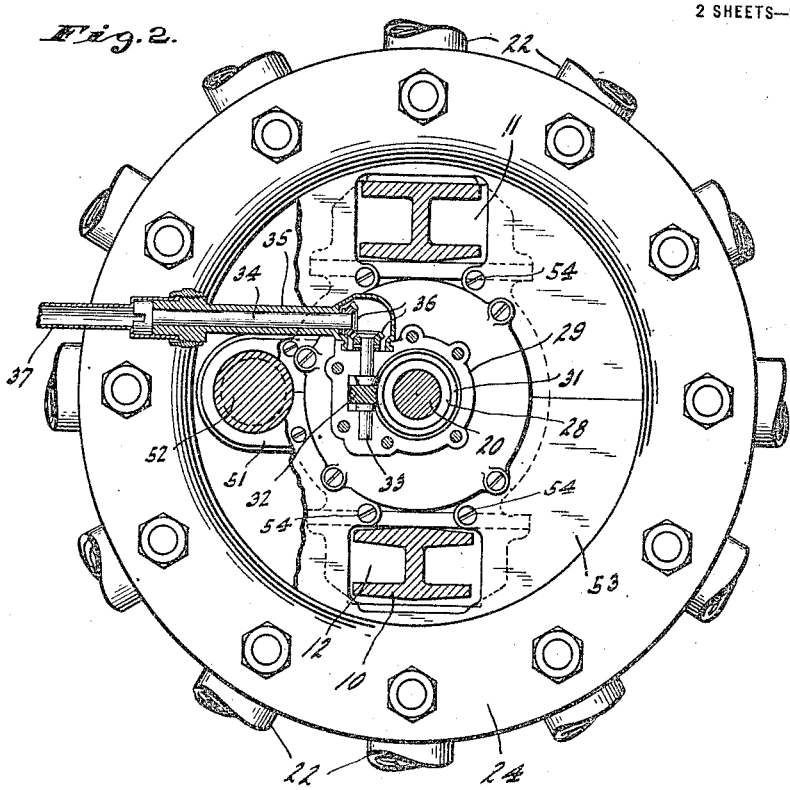

HOWARD C. MARMON, OF INDIANAPOLIS, INDIANA.

STEERING AXLE AND WHEEL.

1,137,996.

Specification of Letters Patent.

Patented May 4, 1915.

Application filed August 1, 1912. Serial No. 712,720.

*To all whom it may concern:*

Be it known that I, HOWARD C. MARMON, a citizen of the United States, residing at Indianapolis, in the county of Marion and State of Indiana, have invented a new and useful Steering Axle and Wheel, of which the following is a specification.

The object of my invention is to produce a steering axle and wheel structure for automobiles, which shall be very compact and at the same time very strong, which shall have the steering axis of the wheel substantially in the plane of the wheel, which shall provide a canting of the wheel without a corresponding canting of its steering axis, and which shall be provided with a speedometer attachment within the axle fork.

The accompanying drawings illustrate my invention.

Figure 1 is a vertical longitudinal section, partly in elevation, through a fragment of a steering axle and wheel structure embodying my invention; and Fig. 2 is a section, on a slightly reduced scale, on the line 2—2 of Fig. 1.

The fixed axle 10 is bifurcated at each end, and between its upper and lower arms 11 and 12 at each end is mounted a frame or cage 13 movable relatively to the axle 10 about an axis intersecting said arms and substantially perpendicular to the axis of the axle. The cage 13 is built to receive upper and lower tapered bushings 14, which are clamped in place by bolts 15 and nuts 16, the latter conveniently being provided with curved faces fitting against the inner surface of the cage. The bushings 14 project beyond the upper and lower surfaces of the cage, and between such projecting ends and the arms 11 and 12 are suitable roller or other anti-friction bearings 17. The arms 11 and 12 are conveniently drilled through to allow the ready insertion and removal of the bushings 14, the openings being closed by suitable caps 18.

Projecting longitudinally through the cage 13 is a spindle 20, which is integral with or otherwise attached to the hub 21 of the vehicle wheel, the spokes 22 of such wheel being clamped between a flange 23 of such hub and a removable flange 24. The axis of the spindle 20 is inclined slightly to the axis of the axle 10, as shown by chain and dotted lines in Fig. 1, so that the plane of the wheel is slightly canted from the vertical or is at a slight angle to the steering axis about which the cage 13 turns between the arms 11, as also shown by chain and dotted lines in Fig. 1. The axes of rotation of the spindle 20 and the cage 13 intersect in the plane of the wheel. Roller or other anti-friction bearings 25 and 26 are located between the spindle 20 and the cage at the outer and inner ends of the cage respectively, or on opposite sides of the axis of rotation of the cage and of the plane of the wheel, the bearing 25 being held in place by a cap 27 screwed into the outer end of the cage and the bearing 26 by a nut 28 screwed on the end of the spindle 20. The nut 28 is covered by a cap 29 which fits over the inner end of the cage 13.

The nut 28 is provided with a spiral gear 31, which meshes with a spiral pinion 32 on a small vertical shaft 33 suitably mounted in the cap 29. A shaft 34, extending horizontally, is mounted in a tube 35 which is swiveled to the cap 29 on the axis of the shaft 33, the shafts 33 and 34 being connected by bevel gearing 36. The shaft 34 is connected by a suitable flexible shaft, located in the tube 37, to a speedometer.

Integral with the cage 13 is a lateral extension 51 which is bored to receive the end of the steering arm or lever 52. The arm 52 is projected through an eccentric opening in a guard plate 53 and the plate 53 is also attached at various points as indicated at 54 to the cage 13. Plate 53 has an external diameter substantially fitting the interior of the flange 24 so as to serve as a guard to prevent the entry of dirt into the interior of the wheel hub.

I claim as my invention:

1. In combination, a fixed axle having its end bifurcated to form upper and lower arms, a cage pivotally mounted between said arms on an axis intersecting said arms and substantially perpendicular to the axis of the axle, a spindle mounted in such cage on an axis which is canted slightly relatively to the axis of said axle and intersects the axis on which the cage is rotatable, and a vehicle wheel fixed on such spindle, the plane of such wheel intersecting the axis on which the cage is rotatable at a point within the cage structure.

2. In combination, a fixed axle having its end bifurcated to form upper and lower arms, a cage pivotally mounted between said arms on an axis intersecting said arms and substantially perpendicular to the axis of the axle, a spindle mounted in such cage on an axis which is canted slightly relatively to the axis of said axle and intersects the axis on which the cage is rotatable, and a vehicle wheel fixed on such spindle.

3. In combination, a fixed axle having its end bifurcated to form upper and lower arms, a cage pivotally mounted between said arms on an axis intersecting said arms, a spindle mounted in such cage and having its axis slightly inclined vertically from the axis of the axle and intersecting the pivotal axis of the cage, and a vehicle wheel fixed on such spindle.

4. In combination, a fixed axle, a cage pivotally mounted in one end of said axle on an axis transverse to the axis of the axle, anti-friction bearings between said cage and said axle, a spindle extending longitudinally through said cage and having its axis slightly inclined vertically from the axis of the axle and intersecting the pivotal axis of the cage, anti-friction bearings between said spindle and said cage on each side of the axis on which the cage is rotatable, and a vehicle wheel fixed on said spindle.

5. In combination, a fixed axle, a cage pivotally mounted in one end of said axle on an axis transverse to the axis of the axle, a spindle extending logitudially through said cage and having its axis slightly inclined vertically from the axis of the axle and intersecting the pivotal axis of the cage, and a vehicle wheel fixed on said spindle.

6. In combination, a fixed axle, a cage pivotally mounted in one end of said axle on an axis transverse to the axis of the axle, anti-friction bearings between said cage and said axle, a spindle extending longitudinally through said cage and having its axis slightly inclined vertically from the axis of the axle and intersecting the pivotal axis of the cage, anti-friction bearings between said spindle and said cage, and a vehicle wheel fixed on said spindle.

7. In combination, a fixed axle, a cage pivotally mounted in one end of said axle on an axis substantially perpendicular to the axis of the axle, a spindle extending longitudinally through said cage, and a vehicle wheel fixed on said spindle, the axis of the spindle and the axis on which the cage is rotatable intersecting in the plane of the wheel at an oblique angle.

8. In combination, an axle, a vehicle wheel, and a frame on which said vehicle wheel is rotatably mounted and which is pivotally mounted on the axle, the axis of rotation of the wheel and the axis of rotation of the frame intersecting in the plane of the wheel at an oblique angle.

9. In combination, an axle having two substantially vertical bearing pockets, a bearing-carrying tubular cage arranged between the two bearing pockets, and a pair of gudgeon pins removably mounted in and projecting radially from said cage and into the bearing pockets, each of said gudgeon pins having a tapered fit in said cage and being bored longitudinally, a bolt extending through the bore of each gudgeon pin, a clamping nut associated with each of said bolts, said nuts and bolts coöperating to hold said gudgeon pins in place in the cage by bearing against the outer ends of the gudgeon pins and an inner surface of the cage, and a wheel rotatably associated with said cage.

10. In combination, an axle having two substantially vertical bearing pockets, a bearing-carrying tubular cage arranged between the two bearing pockets, a pair of gudgeon pins removably mounted in and projecting radially from said cage and into the bearing pockets, a clamping bolt extending through each of said gudgeon pins, a clamping nut associated with each of said bolts to clamp the gudgeon pins in place, and a wheel rotatably associated with said cage.

11. In combination, an axle, a vehicle wheel, and a frame on which said vehicle wheel is rotatably mounted and which is pivotally mounted on the axle, the axis of rotation of the wheel and the axis of rotation of the frame intersecting at an oblique angle and the axis of rotation of the frame being substantially perpendicular to the axis of the axle.

12. In combination, an axle having two substantially vertical bearing pockets, a bearing-carrying tubular cage arranged between the two bearing pockets, a pair of gudgeon pins removably mounted in and projecting radially from said cage and into the bearing pockets, anti-friction bearings surrounding the projecting ends of said gudgeon pins and located in said bearing pockets, a clamping bolt extending through each of said gudgeon pins, a clamping nut associated with each of said bolts to clamp the gudgeon pins in place, and a wheel rotatably associated with said cage.

13. In combination, an axle having two substantially vertical bearing pockets, a bearing-carrying tubular cage arranged between the two bearing pockets, a pair of gudgeon pins which have a tapered fit in said tubular cage and project radially therefrom and into the bearing pockets, the smaller ends of such pins being toward the center of the cage, means for clamping said gudgeon pins in said tubular cage, and a wheel rotatably associated with said cage.

14. In combination, an axle having its end bifurcated to form upper and lower arms, each of said arms having in it a substantially vertical bearing pocket on its inner face and an aperture extending from such bearing pocket through to its outer face, a bearing-carrying tubular cage arranged between the two arms, gudgeon pins removably mounted in said bearing-carrying cage and projecting outwardly therefrom into the two bearing pockets, but having their outer ends short of the outer faces of said arms, means for removably clamping said gudgeon pins in place in said bearing-carrying cage, said gudgeon pins being removable through the apertures which extend from the bearing pockets to the outer faces of the two arms of the axle, and a wheel rotatably associated with said cage.

15. In combination, an axle having its end bifurcated to form upper and lower arms, each of said arms having in it a substantially vertical bearing pocket on its inner face and an aperture extending from such bearing pocket through to its outer face, a bearing-carrying tubular cage arranged between the two arms, gudgeon pins removably mounted in said bearing-carrying cage and projecting outwardly therefrom into the two bearing pockets, but having their outer ends short of the outer faces of said arms, means for removably clamping said gudgeon pins in place in said bearing-carrying cage, said gudgeon pins being removable through the apertures which extend from the bearing pockets to the outer faces of the two arms of the axle, a spindle mounted within said bearing-carrying cage, and a wheel carried on said spindle and projecting over the outer ends of the gudgeon pins.

In witness whereof, I have hereunto set my hand and seal at Indianapolis, Indiana, this 25th day of July, A. D. one thousand nine hundred and twelve.

HOWARD C. MARMON. [L. S.]

Witnesses:
FRANK A. FAHLE,
MAY LAYDEN.